United States Patent [19]

Miller

[11] 4,087,806
[45] May 2, 1978

[54] PLASMA DISPLAY CONTROL APPARATUS

[76] Inventor: Michael James Miller, Ashfield Rd., Midhurst, Sussex, England

[21] Appl. No.: 657,224

[22] Filed: Feb. 11, 1976

[30] Foreign Application Priority Data

Feb. 17, 1975 United Kingdom ................ 6699/75

[51] Int. Cl.² ............................................ G06K 15/18
[52] U.S. Cl. ........................ 340/324 M; 315/169 TV; 358/240
[58] Field of Search ............... 340/324 M; 178/7.3 D; 358/240; 315/169 TV

[56] References Cited

U.S. PATENT DOCUMENTS

| | | | |
|---|---|---|---|
| 3,559,190 | 1/1971 | Bitzer et al. | 340/324 M |
| 3,845,243 | 10/1974 | Schmersal et al. | 340/324M |
| 3,937,878 | 2/1975 | Judice | 340/324 M |

Primary Examiner—David L. Trafton
Attorney, Agent, or Firm—Christie, Parker & Hale

[57] ABSTRACT

Apparatus for controlling persistence of the display on a plasma display device by scanning the cells of a display device in an apparently random manner and extinguishing those cells whose addresses are stored for that purpose thereby to produce controlled fading of transient display features while maintaining permanent features of the display.

10 Claims, 4 Drawing Figures

PLASMA DISPLAY CONTROL APPARATUS

The present invention relates to apparatus for controlling a multicell plasma display device and particularly to apparatus for limiting and controlling the apparent persistence of a display produced on the device.

Plasma display devices, having a multitude of cells arranged in a rectangular array with means for illuminating and extinguishing selected cells according to address coordinate input signals, are now commercially available and are being developed in forms which may be useful in place of cathode-ray tube displays for many purposes. For some application (e.g. for air traffic control displays) a facility for allowing a display (or selected parts of a display) to give an appearance of gradual fading is advantageous and a facility for providing selective and controllable fading effects would be even more useful. However such a facility is not easily achieved because the brightness of a plasma discharge cell can only be varied over a very limited range. It has been suggested that the apparent brightness of a feature which extends over a plurality of adjacent cells on the display device may be effectively controlled by varying the proportion of the cells illuminated. U.S. Pat. No. 3,821,721 describes one of the different ways in which this may be done so as to reproduce selected features with different effective brightness.

It is an object of the present invention to provide apparatus for controlling a multicell plasma display device so as to produce fading effects. It is another object to provide some embodiments of the invention which may give adjustable or selective fading effects.

According to the present invention there is provided apparatus for controlling a multicell plasma display device including a persistence control circuit for extinguishing illuminated cells in a controlled but apparently random manner, the said circuit comprising a multi-digit counter and extinguishing means with address connections for determining the addresses of cells to be extinguished connected to the counter so that the least significant digits of the count therein will determine the most significant bits of the address coordinates of the cell to be extinguished. Preferably if $c_{2n+1} \ldots c_1 c_0$ is the count in the counter wherein $c_{2n+1} \ldots c_1, c_0$ represent binary digits of decreasing significance then the address connections of the extinguishing means are arranged to derive the X and Y coordinates of the cell to be extinguished according to the following equations wherein the symbol (+) indicates modulo-two addition:

$$c_{2n+}(+) c_{2n} = x_o$$
$$c_{2n} = y_o$$
$$c_{2n-1}(+) c_{2n-2} = x_1$$
$$c_3 (+) c_2 = x_{n-1}$$
$$c_2 = y_{n-1}$$
$$c_1 (+) c_o = x_n$$
$$c_o = y_n$$

$X = x_n \ldots x_1 x_o$ wherein $x_n \ldots x_1, x_o$ are regarded as binary digits of decreasing significance and $Y = y_n \ldots y_1 y_o$ wherein $y_n \ldots y_1, y_o$ are regarded as binary digits of decreasing signficance.

Alternatively the equations for the X digits may be replaced by the simpler equations $$c_{2n+1} = x_o$$
$$c_{2n-1} = x_1$$
$$c_3 = x_{n-1}$$
$$c_1 = x_n$$

In either case when the multi-digit counter is made to count consecutive multi-digit numbers in the conventional way the sequence of cells addressed for erasing (extinguishing) appears to skip about the array of cells in an apparently random manner which is however so controlled that every cell will be addressed just once in a complete counting cycle. The counting rate determines the time taken to complete a cycle addressing and extinguishing every cell once, which will be the maximum time for which any cell can stay illuminated. Assuming that every significant feature of the reproduction extends over a considerable number of adjacent cells and is therefore shown by several illuminated cells the resulting effect is a gradual fading controlled by the counting rate. Selective fading effects may be arranged by resetting the counter so that some counts are not reached and the corresponding addresses are therefore not extinguished. These addresses may be used to display background information which is required to be persistently displayed. Alternatively a list of addresses of cells used to display such background information may be maintained in a store and compared with the coordinate signals derived by the address connections by a comparator whose output is used to cause relighting signals to be applied, instead of extinguishing signals, to such cells whenever their addresses appear on the address connections.

The invention is preferably used in conjunction with apparatus for controlling the illumination of cells on the display device according to intensity code signals; this apparatus (hereinafter called the tone control circuit) allows effects of graded brightness to be substantially achieved. It involves the classification of cells according to category codes which are derived from the least significant digits of the cell address coordinates. The derivation of the category codes in the tone control circuit may be done in several different ways, and the derivation of the addresses in the persistence control circuit can also be done in various different ways, leading to several different forms of each apparatus; it is advantageous to use corresponding forms in conjunction with each other, so that the addresses which are not reached when the counter is the persistence control circuit is reset comprise the addresses of cells in some specific categories with respect to the tone control circuit.

Embodiments of the invention will now be described by way of example only with reference to the accompanying drawings, of which:

Figure 1:
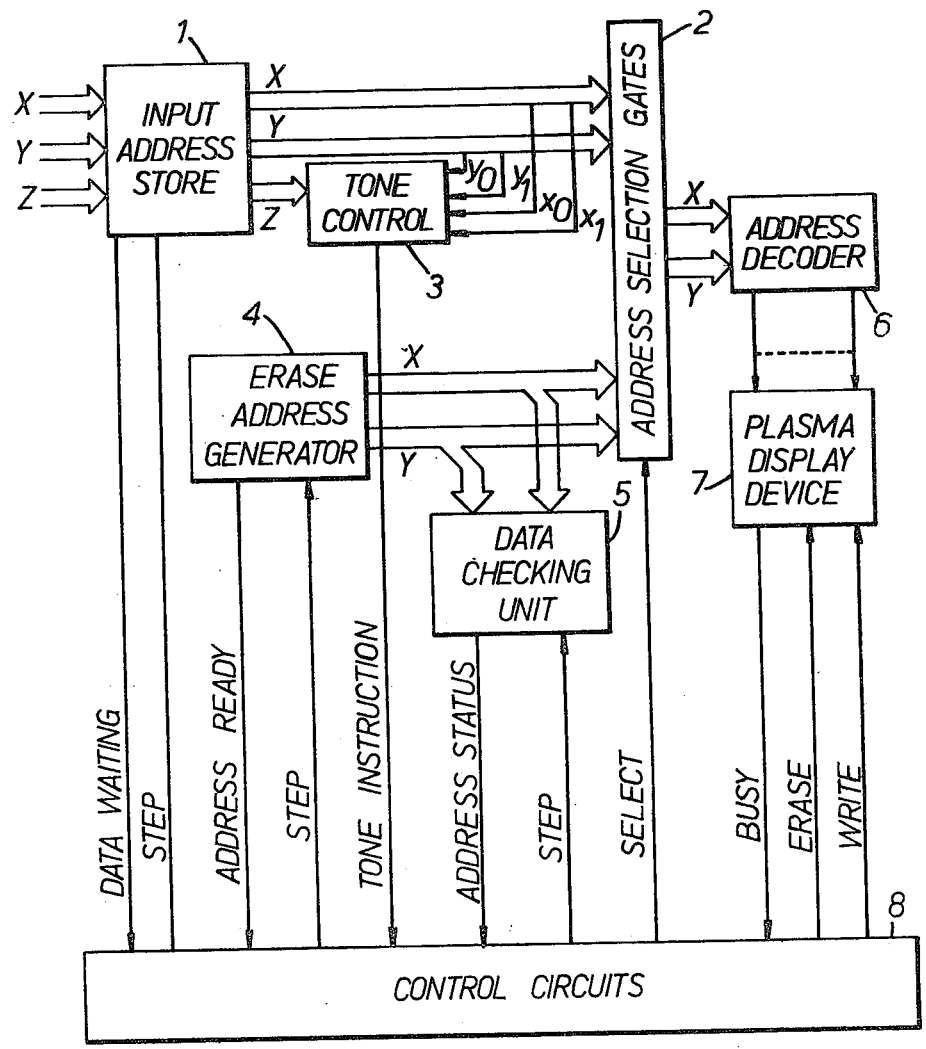
FIG. 1 is a schematic block circuit diagram of apparatus for controlling a multicell plasma display device.

FIG. 1 shows an input address store 1 with input lines for receiving X and Y signals indicating the cartesian coordinate addresses of cells to be illuminated to represent features of a desired display and input lines for receiving associated intensity code (Z) signals indicating the required brightness of the features in the display. In various applications of the apparatus these X, Y and Z signals will be generated by other apparatus not shown, e.g. a radar receiver or a computer. The input address store 1 is a buffer store of conventional construction which passes signals in order, on a first-in first-out basis. X and Y output signals from the store 1 are applied to address selection gates 2. A tone control circuit 3 is connected to receive the Z signals and the least significant digits of the X and Y signals from the outputs of the store 1; it may have any one of several alternative forms. The tone control circuit 3 is able to inhibit write signals sent to the display device 7.

An erase address generator circuit 4 has outputs connected to the address selection gates 2. Outputs from the erase address generator representing X and Y cell address coordinates are also applied to a fixed data checking unit 5. Outputs from the address selection gates 2 are connected to an address decoder 6 which has outputs for enabling the addressed cells of a multicell plasma display device 7 to be illuminated or extinguished (erased). Control circuits 8 (which are more fully shown in FIG. 4) are connected to receive data waiting signals from the input address store 1, to apply stepping instruction signals to the store 1, the erase address generator 4, and the data checking unit 5, to receive instruction signals from the fixed data checking unit 5, to control the address selection gates 2, to receive busy signals from the plasma display device 7 and to apply write or erase signal waveforms as required to the plasma display device 7. The plasma display device 7 comprises a rectangular array of plasma discharge cells which may be selectively illuminated or extinguished.

The control circuits 8 are arranged to give precedence to the forming of the required display on the device 7. Thus the processing of signals through the input address store 1 and tone control circuit 3 is given priority over the other functions of the apparatus hereinafter described. The plasma display device 7 requires a significant minimum time to illuminate or extinguish any cell; during such actions it energises its busy signal line, which temporily inhibits any changes in the control circuits 8.

The erase address generator circuit 4 is driven by an intermittent clock pulse generator circuit (not shown) and produces address signals in a predetermined sequence, at an average frequency which may be manually controlled. When the display device is not busy and there is no data waiting in the input address store 1, the control circuits 8 cause a pair of X and Y address signals to be read out from the address generator 4 to the fixed data checking unit 5 and enable the address selection gates 2 to transmit these address signals to the decoder 6. A clock pulse is then applied to the address generator 4, causing it to step to the next address. The fixed data check unit 5 is a store having as many locations as are required for the display of static background information. Each location in the checking unit stores an address which is dedicated to the display of background information. This will clearly be an arbitrary address, predetermined for any particular application of the apparatus. When an address is applied to the data checking unit 5 this causes a corresponding instruction to be applied to the control circuits which in turn causes either a write signal or an erase signal to be applied to the plasma display device 7. The write signal is selected when the address being generated by the address generator 4 is identical to an address stored in the checking unit 5, and the erase signal in other cases. To simplify comparison, addresses may be stored in the checking unit 5 in the same order as they are generated by the address generator 4; after a positive comparison has caused a write signal to be generated the checking unit steps to the next address location.

Figure 2:
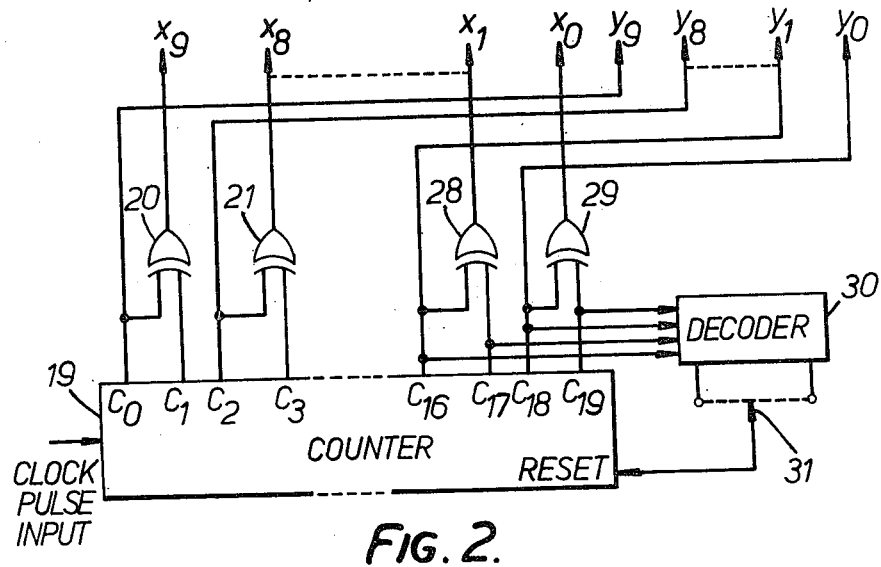
FIGS. 2 and 3 are schematic circuit diagrams of alternative forms for an erase address generator circuit in the apparatus of FIG. 1.

FIG. 2 shows the preferred from for the erase address generator circuit (block 4 of FIG. 1). A 20-bit binary counter 19 is arranged to count clock pulses and has parallel outputs respectively representing the digits of the count $c_{19} \ldots c_1 c_0$ wherein $c_{19} \ldots c_1, c_0$ are binary digits of decreasing significance i.e. $c_{19}$ is the most significant and $c_0$ is the least significant digit of the count. The even-numbered outputs $c_0, \ldots c_2, \ldots c_{18}$ are connected to input lines $y_9, y_8 \ldots y_1, y_0$ respectively of the address selection gate (2 of FIG. 1). There are ten exclusive —OR or modulo-2 adder circuits 20 to 29 each having inputs connected to adjacent outputs of the counter 19. The outputs of the adder circuits 20 to 29 are connected to input lines $x_9, x_8, \ldots x_1, x_0$ of the address selection gates (2 of FIG. 1) so that for example the adder circuit 20 has inputs connected to receive the counter outputs $c_0$ and $c_1$ and an output connected to feed the gate input $x_9$; the next adder 21 has connections from $c_2$ and $c_3$ and to $x_8$; and so on until the last adder 29 is connected from $c_{18}$ and $c_{19}$ and to $x_0$. The four most significant outputs $c_{16}$ to $c_{19}$ of the counter 19 are also connected to a decoder circuit 30. The decoder 30 is a conventional selector circuit having sixteen outputs of which one will be selected and energised according to the value of the number formed by the digits $c_{16}$ to $c_{19}$. The counter 19 has a resetting connection which may be either disconnected or connected to any chosen one of the outputs of the decoder 30 through a switch 31.

This preferred form of erase address generator is particularly arranged for use in conjunction with the preferred form of tone control circuit. Their relationship is shown by the following table, wherein the second column lists the binary numbers formed by the four most significant digits of the count in the counter 19 as it proceeds; the first column lists the decimal values D of these binary numbers and therefore also the serial number of the output of the decoder 31 which is energised at each stage of the count. The third and fourth columns give the bits $x_1 x_0$ and $y_1 y_0$ which are derived by the connections of FIG. 2 and the last column gives the decimal value of the category code allocated by the preferred tone control circuit to cells whose addresses include these values of $x_1 x_0 y_1 y_0$.

| D | $c_{16} c_{17} c_{18} c_{19}$ | $x_1 x_0$ | $y_1 y_0$ | category code value |
|---|---|---|---|---|
| 0 | 0 0 0 0 | 0 0 | 0 0 | 0 |
| 1 | 1 0 0 0 | 1 0 | 1 0 | 1 |
| 2 | 0 1 0 0 | 1 0 | 0 0 | 2 |
| 3 | 1 1 0 0 | 0 0 | 1 0 | 3 |
| 4 | 0 0 1 0 | 0 1 | 0 1 | 4 |
| 5 | 1 0 1 0 | 1 1 | 1 1 | 5 |
| 6 | 0 1 1 0 | 1 1 | 0 1 | 6 |
| 7 | 1 1 1 0 | 0 1 | 1 1 | 7 |
| 8 | 0 0 0 1 | 0 1 | 0 0 | 8 |
| 9 | 1 0 0 1 | 1 1 | 1 0 | 9 |
| 10 | 0 1 0 1 | 1 1 | 0 0 | 10 |
| 11 | 1 1 0 1 | 0 1 | 1 0 | 11 |
| 12 | 0 0 1 1 | 0 0 | 0 1 | 12 |
| 13 | 1 0 1 1 | 1 0 | 1 1 | 13 |
| 14 | 0 1 1 1 | 1 0 | 0 1 | 14 |
| 15 | 1 1 1 1 | 0 0 | 1 1 | 15 |

This table shows clearly that if the switch 31 is set to a particular output of the decoder 30, for example the output for which D equals ten, the consequent resetting of the counter 19 will prevent it from generating the addresses of the cells which are in categories ten to fifteen inclusive with respect to the preferred form of tone control circuit. The apparatus will then generate addresses of cells of categories one to nine inclusive at a rate determined by the average clock pulse rate and will thus apply a gradual fading or controllable limited persistence effect to features of the display presented on these cells while allowing the features displayed on the cells of higher categories to be indefinitely persistent.

Figure 3:
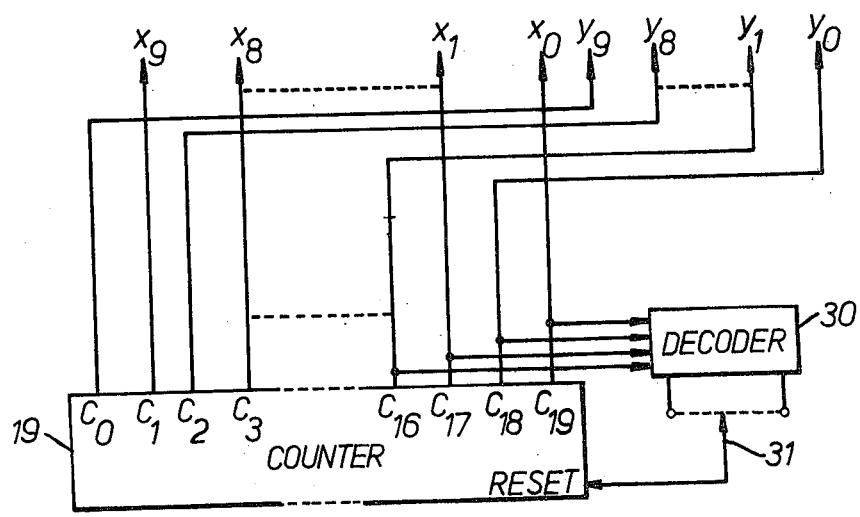

FIG. 3 shows an alternative form of erase address generator circuit in which the modulo-two adder circuits 20 to 29 are omitted and replaced by direct connections from $c_1$ to $x_9$, $c_3$ to $x_8$ etc. This is suitable for use with an alternative form of tone control circuit.

Figure 4:
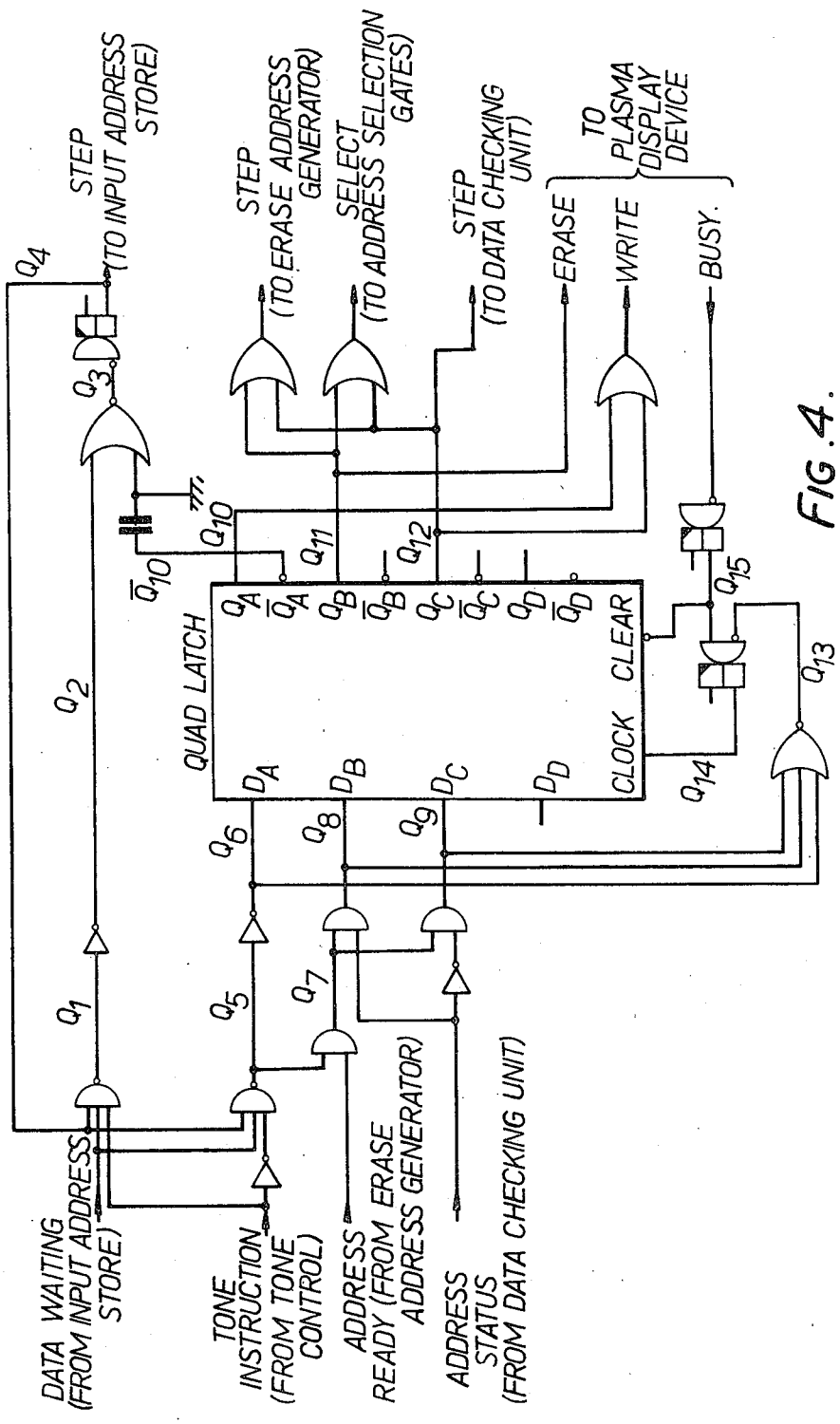
FIG. 4 is a schematic circuit diagram of control circuits used in the apparatus of FIG. 1.

The control circuits 8 of FIG. 1 may be a simple arrangement of logical elements arranged to ensure that the various operations of the apparatus hereinbefore described will proceed with appropriate precedence as described. FIG. 4 shows one possible form for the circuits 8.

I claim:

1. Apparatus for controlling a multicell plasma display device which includes an input for receiving a sequence of addresses, each address including two signals with each of the two signals having an ordered plurality of bits and identifying a respective one of two orthogonal coordinates of a cell, and which further includes a persistence control circuit for extinguishing the respective illuminated cell identified by each received address, the apparatus comprising: means for supplying a sequence of addresses such that the persistence control circuit extinguishes illuminated cells in a controlled but apparently random manner; said means including a multi-digit counter for sequencing through a series of counts, each count being defined by an ordered plurality of digits; and said means further including means responsive to the counts for determining the addresses of the cells to be extinguished such that, for each of the two signals of each address, the most significant digits of the count determine the least significant bits of the signal identifying a respective one of the coordinates.

2. Apparatus as claimed in claim 1, wherein the ordered plurality of digits is symbolized, in decreasing order of significance, by the binary digits $c_{2n+1} \ldots c_1 c_o$, and wherein said means responsive to the counts is arranged to derive X coordinates of the cell to be extinguished according to the following equations:

$c_{2n+1} = x_o$
$c_{2n-1} = x_1$
$c_3 = x_{n-1}$
$c_1 = x_n$

3. Apparatus as claimed in claim 1, wherein the ordered plurality of digits is symbolized, in decreasing order of significance, by the binary digits $c_{2n+1} \ldots c_1 c_o$, and wherein said means responsive to the counts is arranged to derive X and Y coordinates of the cell to be extinguished according to the following equations wherein the symbol (+) indicates modulo-two addition:

$c_{2n+1} (+) c_{2n} = x_o$
$c_{2n} = y_o$
$c_{2n-1} (+) c_{2n-2} = x_1$
$c_3 (+) c_2 = x_{n-1}$
$c_2 = y_{n-1}$
$c_1 (+) c_o = x_n$
$c_o = y_n$
$X = x_n \ldots x_1 x_o$ wherein $x_n \ldots x_1, x_o$ are regarded as binary digits of decreasing significance and $Y = y_n \ldots y_1 y_o$ wherein $y_n \ldots y_1, y_o$ are regarded as binary digits of decreasing significance.

4. Apparatus as claimed in claim 3, in which the counter is adjustable so that some counts are not reached to prevent extinguishing of the corresponding addresses.

5. Apparatus as claimed in claim 3, including a store whose output is compared with the coordinate signals derived by the address connections in a comparator the output whereof is used to cause relighting signals to be applied to those cells whose address is stored in the store whenever their addresses appear on the address connections.

6. Apparatus for controlling a multicell plasma display device and including a persistence control circuit for extinguishing illuminated cells in a controlled but apparently random manner, the apparatus comprising a multi-digit counter the outputs of which are used to determine the addresses of cells to be extinguished so that the least significant digits of the count therein will determine the most significant bits of the address coordinates of the cell to be extinguished.

7. Apparatus as claimed in claim 6, wherein if $c_{2n+1} \ldots c_1 c_o$ is the count in the counter wherein $c_{2n+1}, \ldots c_1, c_o$ represent binary digits of decreasing significance then the X coordinates of the cell to be extinguished are derived according to the following equations:

$c_{2n+1} = x_o$
$c_{2n-1} = x_1$
$c_3 = x_{n-1}$
$c_1 = x_n$.

8. Apparatus as claimed in claim 6, wherein if $c_{2n+1} \ldots c_1 c_o$ is the count in the counter wherein $c_{2n}, \ldots c_1, c_o$ represent binary digits of decreasing significance then the X and Y coordinates of the cell to be extinguished are derived according to the following equations wherein the symbol (+) indicates modulo-two addition:

$c_{2n+1} (+) c_{2n} = x_o$
$c_{2n} = Y_o$
$c_{2n-1} (+) c_{2n-2} = x_1$
$c_3 (+) c_2 = x_{n-1}$
$c_2 = Y_{n-1}$
$c_1 (+) c_o = x_n$ $_{pl} c_o = y_n$
$X = x_n \ldots x_1 x_o$ wherein $x_n \ldots x_1, x_o$ are regarded as binary digits of decreasing significance and $Y = y_n \ldots y_1 y_o$ wherein $y_n \ldots y_1, y_o$ are regarded as binary digits of decreasing significance.

9. Apparatus as claimed in claim 8, in which the counter is adjustable so that some counts are not reached to prevent extinguishing of the corresponding addresses.

10. Apparatus as claimed in claim 8, including a store whose output is compared with the coordinate signals derived by the address connections in a comparator the output whereof is used to cause relighting signals to be applied to those cells whose address is stored in the store whenever their addresses appear on the address connections.

* * * * *

UNITED STATES PATENT AND TRADEMARK OFFICE
CERTIFICATE OF CORRECTION

PATENT NO. : 4,087,806
DATED : May 2, 1978
INVENTOR(S) : Michael James Miller

It is certified that error appears in the above-identified patent and that said Letters Patent are hereby corrected as shown below:

Column 1, line 14, "application" shoud read -- applications --; column 1, line 53 "$C_{2n} + (+) c_{2n} = x_o$" should read -- $c_{2n+1} (+) c_{2n} = x_o$ --.

Column 2, line 47, "is" should read -- in --.
Column 4, line 4, "from" should read -- form --.

Column 6, line 37, "$c_{2n} \cdot 1$," should read -- $c_{2n+1}$, --;
column 6, line 48, delete " pl ".

Signed and Sealed this

Twenty-first Day of November 1978

[SEAL]

Attest:

RUTH C. MASON
Attesting Officer

DONALD W. BANNER
Commissioner of Patents and Trademarks